(12) United States Patent
Campetella et al.

(10) Patent No.: US 10,914,439 B2
(45) Date of Patent: Feb. 9, 2021

(54) LIGHT FIXTURE, PREFERABLY FOR STAGE

(71) Applicants: CLAY PAKY S.p.A., Seriate (IT); OSRAM GMBH, Munich (DE)

(72) Inventors: Francesco Campetella, Seriate (IT); Ulrich Hartwig, Berlin (DE)

(73) Assignees: CLAY PAKY S.P.A., Seriate (IT); OSRAM GMBH, Munich (DE)

(*) Notice: Subject to any disclaimer, the term of this patent is extended or adjusted under 35 U.S.C. 154(b) by 0 days.

(21) Appl. No.: 16/166,760

(22) Filed: Oct. 22, 2018

(65) Prior Publication Data
US 2019/0120447 A1 Apr. 25, 2019

(30) Foreign Application Priority Data
Oct. 24, 2017 (IT) .................... 102017000120670

(51) Int. Cl.
*F21K 9/62* (2016.01)
*F21S 8/02* (2006.01)
(Continued)

(52) U.S. Cl.
CPC .................. *F21S 8/02* (2013.01); *F21K 9/62* (2016.08); *F21S 10/00* (2013.01); *F21V 5/004* (2013.01); *F21V 5/007* (2013.01); *F21V 5/02* (2013.01); *F21V 5/04* (2013.01); *F21V 7/00* (2013.01); *F21V 9/40* (2018.02); *F21V 14/06* (2013.01); *F21V 19/001* (2013.01); *F21V 29/50* (2015.01); *G02B 19/0066* (2013.01); *G02B 27/0961* (2013.01); *G03B 21/2033* (2013.01); *F21S 10/023* (2013.01); *F21W 2131/406* (2013.01);
(Continued)

(58) Field of Classification Search
CPC .... F21K 9/62; F21S 10/00; F21S 8/02; F21V 14/06; F21V 29/50; F21V 5/004; F21V 5/007; F21V 5/04; G02B 19/0066; G02B 27/0961; G03B 21/2033
See application file for complete search history.

(56) References Cited

U.S. PATENT DOCUMENTS 7,682,042 B2 * 3/2010 Feinbloom .............. F21V 14/06
362/249.03
7,862,207 B2 * 1/2011 Baldwin ................. G01N 21/47
362/240
(Continued)

FOREIGN PATENT DOCUMENTS

| EP | 2211089 | 7/2010 |
|---|---|---|
| WO | WO 2013014809 | 1/2013 |
| WO | WO 2014031644 | 2/2014 |

*Primary Examiner* — Arman B Fallahkhair
(74) *Attorney, Agent, or Firm* — Leason Ellis LLP (57) ABSTRACT

A light fixture, preferably for stage, is provided with a source assembly configured to generate a light beam mainly along an emission direction; and with at least a first optical assembly arranged downstream of the source assembly along the emission direction; the first optical assembly comprising at least one mixing device configured to mix the light beam passing through it; the mixing device comprising an optical mixing element and a moving device configured to move the optical mixing element between a position of non-interference with the light beam emitted by the source assembly and at least one position of interference with the light beam emitted by the source assembly.

14 Claims, 5 Drawing Sheets

(51) Int. Cl.
*F21V 29/50* (2015.01)
*G02B 19/00* (2006.01)
*G03B 21/20* (2006.01)
*G02B 27/09* (2006.01)
*F21V 5/04* (2006.01)
*F21V 5/00* (2018.01)
*F21V 14/06* (2006.01)
*F21S 10/00* (2006.01)
*F21V 9/40* (2018.01)
*F21V 5/02* (2006.01)
*F21V 7/00* (2006.01)
*F21V 19/00* (2006.01)
*F21W 131/406* (2006.01)
*F21Y 115/10* (2016.01)
*F21Y 105/12* (2016.01)
*F21S 10/02* (2006.01)

(52) U.S. Cl.
CPC ....... *F21Y 2105/12* (2016.08); *F21Y 2115/10* (2016.08)

(56) References Cited

U.S. PATENT DOCUMENTS

| | | | |
|---|---|---|---|
| 8,931,939 B2* | 1/2015 | Melzner | F21V 5/002 362/244 |
| 8,985,793 B2* | 3/2015 | Osaki | F21V 14/006 362/84 |
| 9,797,571 B2* | 10/2017 | Adams | F21V 5/007 |
| 10,190,751 B2* | 1/2019 | Jorgensen | F21V 14/02 |
| 2008/0084694 A1* | 4/2008 | Rose | F21V 5/04 362/240 |
| 2015/0036354 A1 | 2/2015 | Adams et al. | |

\* cited by examiner

LIGHT FIXTURE, PREFERABLY FOR STAGE

CROSS-REFERENCE TO RELATED APPLICATIONS

This application claims priority from Italian Patent Application No. 102017000120670 filed on Oct. 24, 2017, the disclosure of which is incorporated by reference.

TECHNICAL FIELD

The present invention relates to a light fixture, preferably for stage.

BACKGROUND ART

Light fixtures are used in the entertainment industry to create scenographic effects using light beams.

The entertainment industry is always looking for new scenographic effects, and for powerful, high-performing light fixtures that are also easy and economical to produce. In particular, light fixtures intended for professional use need to be increasingly versatile while continuing to ensure maximum efficiency. For example, depending on the scenographic setup, it must be possible to adjust the light beam between a hot-spot configuration (with the highest intensity at the centre of the beam) and a configuration with a highly uniform beam.

DISCLOSURE OF INVENTION

Therefore, it is an object of the present invention to provide a light fixture that is powerful and high-performing and, at the same time, easy and economical to produce.

In accordance with such objects, the present invention relates to a light fixture as claimed in claim 1.

BRIEF DESCRIPTION OF THE DRAWINGS

Further characteristics and advantages of the present invention will become clear from the following description of a non-limiting embodiment thereof, with reference to the figures in the accompanying drawings, in which.

BEST MODE FOR CARRYING OUT THE INVENTION

Figure 1:
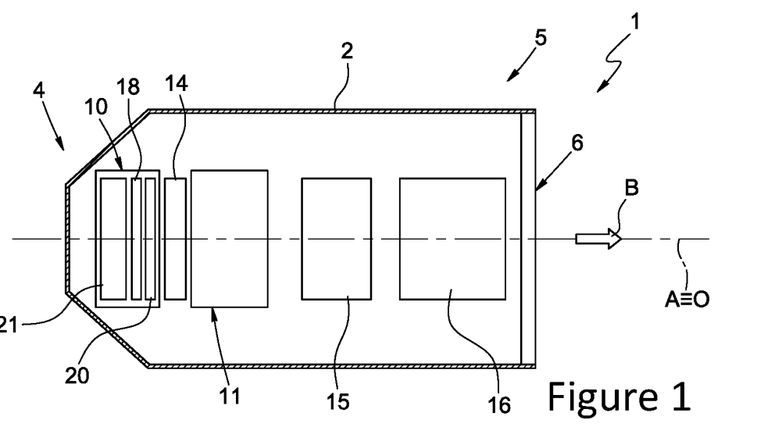
FIG. 1 is a schematic side view, with some parts shown in cross-section and some parts removed for the sake of clarity, of a light fixture according to the present invention.

In FIG. 1 reference numeral 1 indicates a light fixture, preferably for stage.

The light fixture 1 comprises a casing 2 and supporting means (not illustrated in the accompanying figures) configured to support the casing 2. The supporting means are preferably configured to move the casing 2 and to allow the casing 2 to rotate about two orthogonal axes, commonly known as PAN and TILT. The operation of the supporting means is controlled by a movement control device (not visible in the accompanying figures). The movement control device may also be managed remotely preferably using the DMX communication protocol. According to an alternative embodiment, the supporting means may be configured just to support the casing 2 without being able to move it.

The casing 2 extends along a longitudinal axis A and is provided with a first closed end 4 and a second end 5, opposite the first closed end 4 along the axis A, and provided with a projection hole 6. In the non-limiting example described and illustrated herein, the projection hole 6 has a substantially circular cross-section. The projection hole 6 is preferably centred on the axis A of the casing 2.

The light fixture 1 further comprises a frame (not visible in the accompanying figures) coupled to the casing 2, a source assembly 10 and at least a first optical assembly 11.

In the non-limiting example described and illustrated herein, the light fixture 1 additionally comprises a colour assembly 14, arranged between the source assembly 10 and the first optical assembly 11, beam processing means 15 and at least a second optical assembly 16 arranged downstream of the beam processing means 15.

The source assembly 10, the first optical assembly 11, the colour assembly 14, the beam processing means 15 and the second optical assembly 16 are all schematically illustrated in FIG. 1.

The frame is integral with the casing 2 and comprises a plurality of elements coupled to one another and configured to define a supporting structure for the components arranged inside the casing 2, namely the source assembly 10, the first optical assembly 11, the colour assembly 14, the beam processing means 15 and the second optical assembly 16.

The colour assembly 14 comprises at least one colour device configured to selectively colour the incident light beam. The colour assembly 14 preferably comprises four different colour devices, in which each colour device comprises one or more filters having specific characteristics. The colour devices thus differ for the filtering characteristics of the filters they contain.

The beam processing means 15 comprise a plurality of light beam processing elements supported by the frame and configured to process the light beam generated by the source assembly 10 in order to obtain specific effects. In particular, the beam processing elements are supported and/or configured so as to selectively intercept the light beam in order to only modify the light beam when needed. In other words, the beam processing elements can only intercept the beam to alter its properties when needed.

The position of each of the beam processing elements is regulated by a beam processing means control device (not visible in the accompanying figures). The beam processing element control device may also be managed remotely preferably using the DMX communication protocol.

The beam processing means 15 comprise, preferably in sequence, a first gobo device, a rainbow device, a second gobo device, a frost assembly and a prismatic element (not illustrated in the accompanying figures for the sake of simplicity).

It is understood that the beam processing means 15 may comprise additional beam processing elements that are not listed here.

The source assembly 10 is arranged inside the casing 2 at the closed end 4 of the casing 2, it is supported by the frame, and comprises, in the non-limiting example described and illustrated herein, a plurality of light sources 18 (schematically illustrated as a single block in FIG. 1) suitable to emit light beams mainly along an emission direction B, a collimator assembly 20 and a cooling device 21 configured to cool the light sources 18 (schematically illustrated in FIG. 1 only). According to an alternative embodiment that is not illustrated, the source assembly only comprises one main light source, for example a discharge lamp.

Emission direction means the direction towards which the greatest amount of the light beam emitted by the light sources 18 of the source assembly 10 propagates. In particular, since the source assembly 10 comprises several light sources 18, the emission direction is determined by considering the main axis of the sum of the light beams emitted by the light sources 18 which, as described in detail later on in this document, are processed so as to generate a single light beam along an optical axis O.

In the non-limiting example described and illustrated herein, the source assembly 10 comprises a plurality of light sources 18 coupled to a flat supporting plate 19 visible in FIGS. 2-11. The supporting plate 19 is coupled, in use, to the frame of the light fixture 1.

Preferably, the light sources 18 are uniformly distributed in such a way as to generate a plurality of substantially uniformly distributed beams.

The light sources 18 are preferably arranged on a same plane defined by the supporting plate 19 and are substantially arranged as a matrix. In other words, the light sources 18 are arranged along horizontal rows and vertical columns.

Preferably, the matrix of light sources 18 is centred on the longitudinal axis A of the casing 2.

According to an alternative embodiment that is not illustrated, the light sources are arranged symmetrically with respect to at least one plane of symmetry.

According to a further alternative embodiment that is not illustrated, the light sources are substantially arranged as a matrix provided with an even number of columns and are symmetrical with respect to a plane arranged between the innermost columns.

Figure 2:
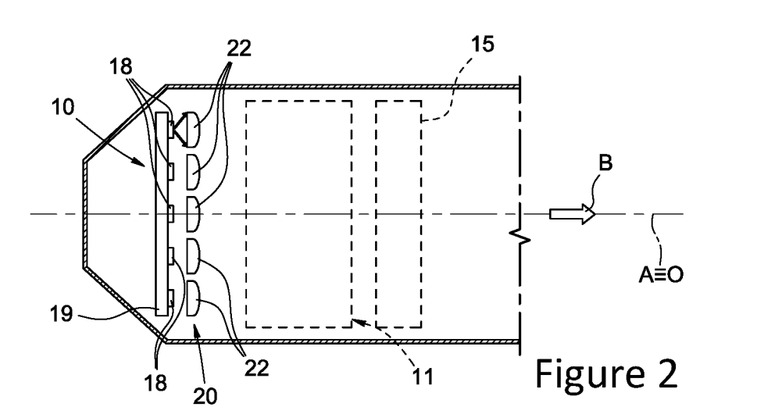
FIG. 2 is a schematic side view, with some parts shown in cross-section and some parts removed for the sake of clarity, of a first detail of FIG. 1.

According to a further alternative embodiment that is not illustrated, the light sources are substantially arranged as a matrix provided with an odd number of columns and are symmetrical with respect to a plane that passes through the innermost column. With reference to FIG. 2, the collimator assembly 20 is arranged downstream of the light sources along the emission direction B so as to intercept the light beam emitted by the light sources 18 and is configured to straighten the incoming light beams. In particular, the collimator assembly 20 comprises a plurality of lenses 22 (schematically illustrated in FIG. 2), each of which is configured to straighten a respective beam emitted by a respective light source 18.

In the case in which the source assembly 10 comprises a single light source, the collimator assembly 12 comprises a reflector, preferably parabolic, coupled to the light source and configured in such a way as to transform the light beam emitted by the light source into a beam of substantially parallel light rays. In this case the collimator assembly 12 is not arranged downstream of the source assembly 10.

Figure 3:
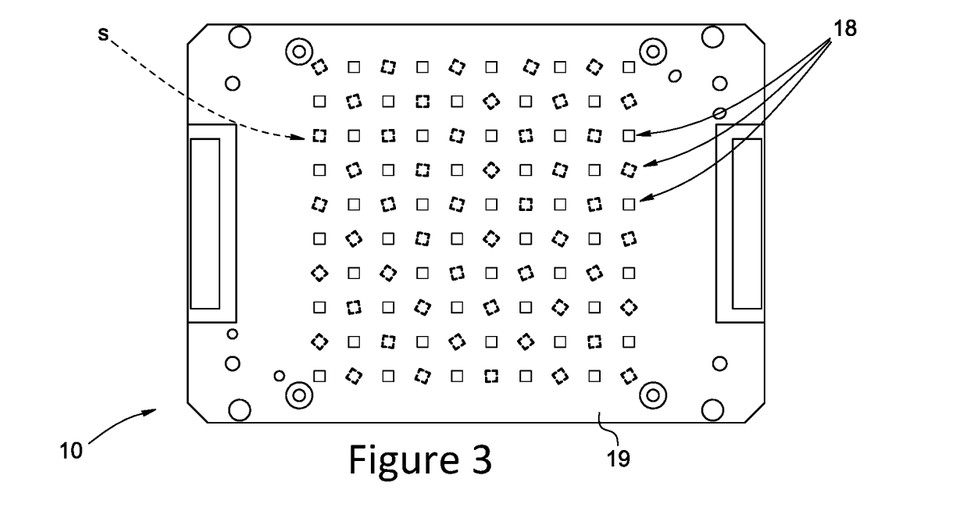
FIG. 3 is a schematic front view of a second detail of FIG. 1 according to a first embodiment of the present invention.

With reference to FIG. 3, a group S made up of n light sources 18 of the plurality of light sources 18 has the same polygonal shape and is configured in such a way that each light source in the group S is rotated with respect to at least one respective other light source in the group S by an angle α equal to $$\alpha = [(360°/R)/K] \quad (1)$$

where:

R=order of rotational symmetry of the polygon defining the shape of the light sources;

K=is a coefficient respecting the following condition

K=5 if n<5

K>5 if n=>5

Here and throughout the rest of this document, the order of rotational symmetry R refers to a natural number other than zero such that the rotation about a point O and by an angle equal to 360°/R transforms the figure into its original shape. The point O is called the centre of rotation of the rotational symmetry. Rotational symmetry is also frequently defined as radial symmetry. For example, a square has a rotational symmetry of order 4, a regular polygon has an order of rotational symmetry equal to the number of its sides, while an irregular polygon has a rotational symmetry of order 1.

In other words, the group S is simply a sub-group of the plurality of light sources 18 (identified in FIG. 3 by means of light sources shown as broken lines) and is composed of light sources all having the same polygonal shape. Each light source 18 belonging to this group S is rotated with respect to at least one respective other light source in the same group S by the angle α described above. Essentially, each light source 18 belonging to the group S is rotated by an angle α with respect to at least one respective other source in the same group S and is rotated by an angle that is a multiple of α with respect to the other light sources in the group S.

Thanks to the specific configuration described above, it is possible to project a light beam with a substantially circular perimeter profile even when the light sources 18 have a non-circular polygonal shape. This can be achieved without the use of optical systems to modify or cut the perimeter profile of the light beam.

In the non-limiting example described herein and illustrated in FIG. 3, the group S comprises a number of sources n equal to 50% of the total number N of light sources 18. The light sources 18 in the group S are all square and are rotated by an angle α equal to 1.8°.

The group S may comprise a variable number n of light sources depending on requirements.

In particular, as described in detail later on in this document, the shape of the group S, the number and the arrangement of the light sources that make up the group S can be chosen to meet particular requirements in relation to other components of the light fixture 1 according to the present invention (for instance, in relation to the type of optical mixing element that is used, as we shall see in more detail later on in this document).

Figures 4, 5, 6, 7:
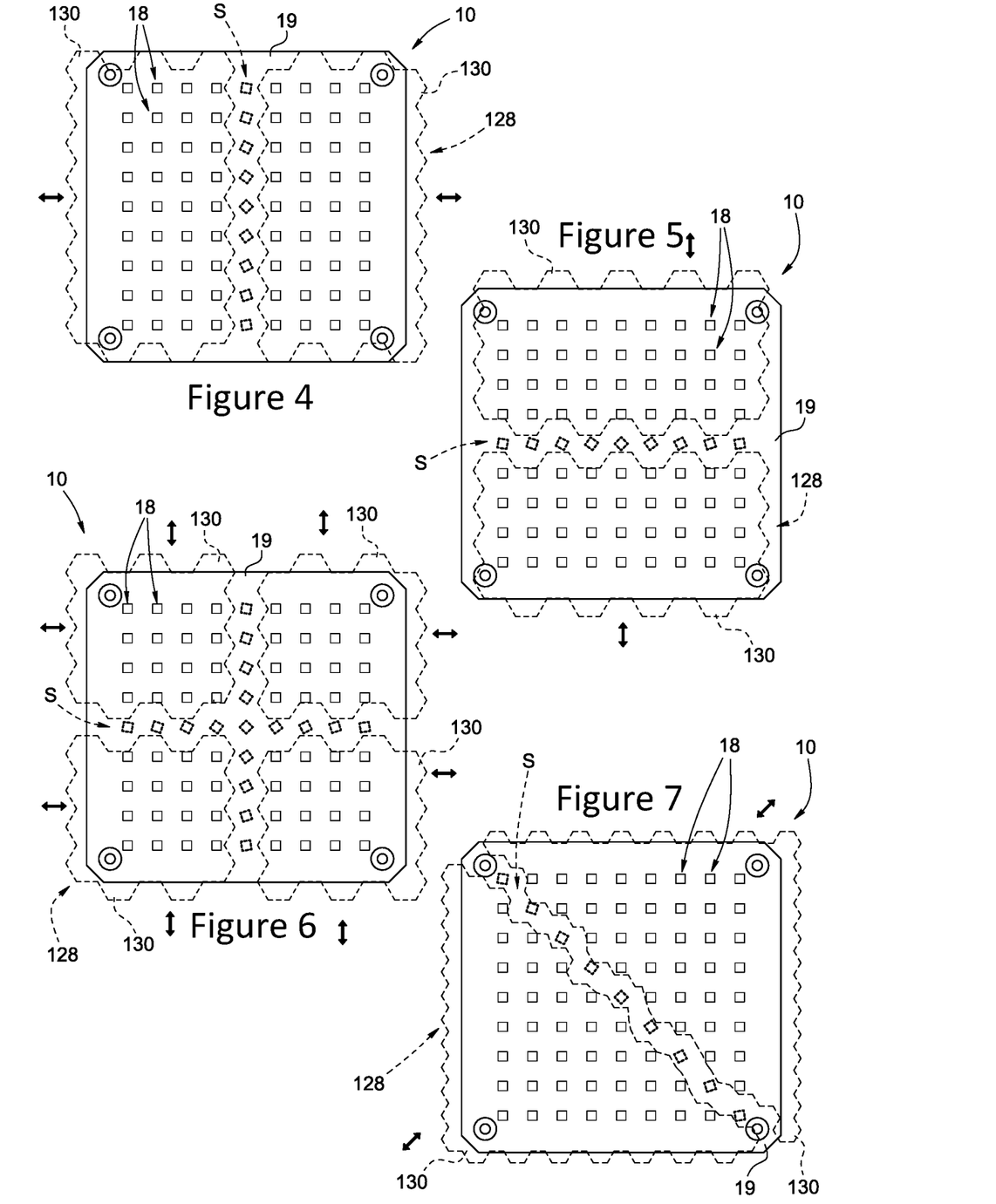
FIGS. 4-11 are schematic front views of alternative embodiments of the second detail of FIG. 3.
Figures 8, 9, 10, 11:
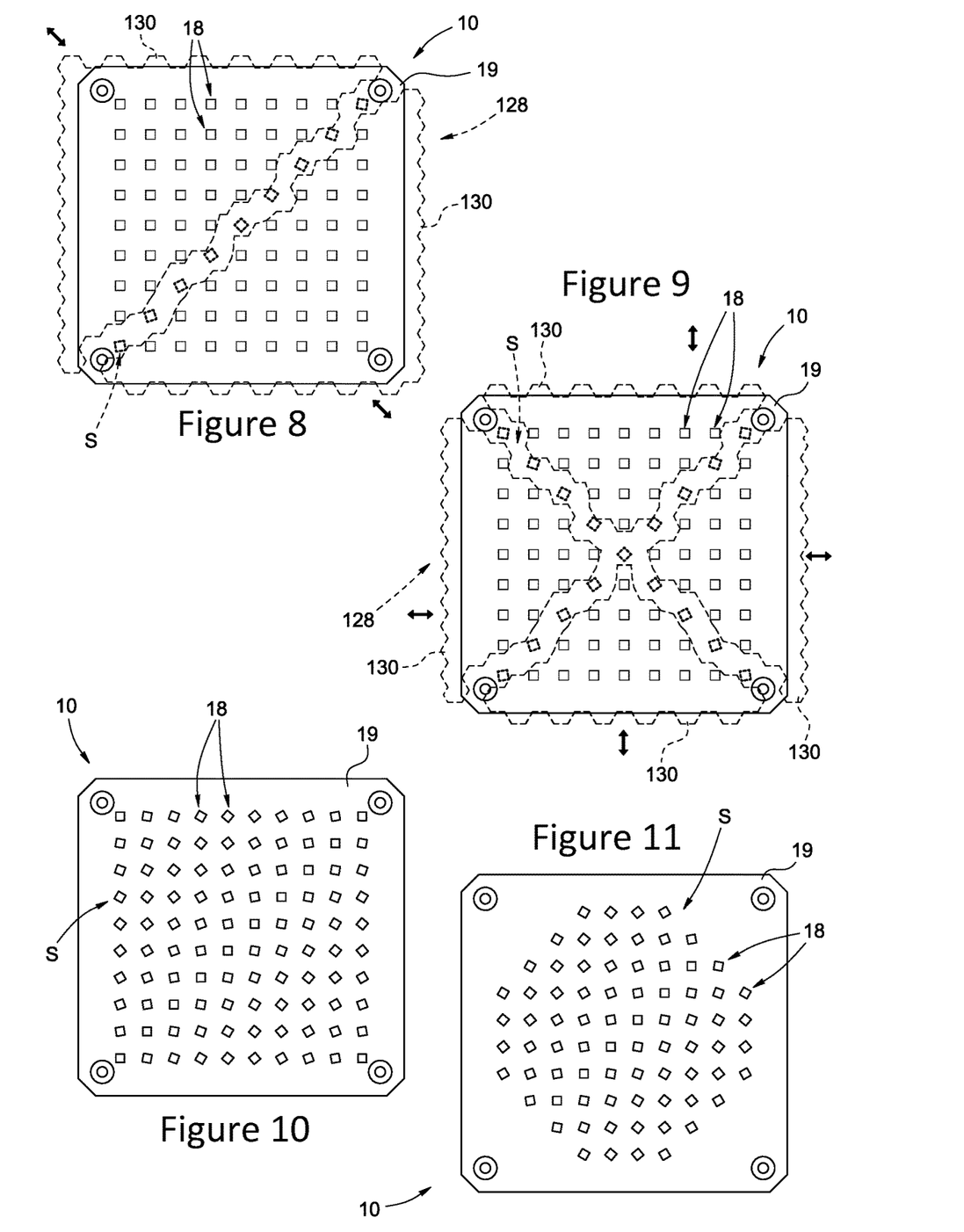

FIGS. 4-9 show alternative embodiments of the present invention in which the group S of light sources 18 is defined by light sources 18 which are rotated and arranged along at least one same row of the matrix (examples in FIGS. 5 and 6), along at least one same column of the matrix (examples in FIGS. 4 and 6) and along at least one same diagonal of the matrix (examples in FIGS. 7-9).

In FIGS. 10 and 11 the group S is defined by 100% of the light sources 18. In other words, in the non-limiting examples illustrated in FIG. 10 and FIG. 11, all the light sources 18 have the same polygonal shape and are each rotated with respect to at least one other according to the above-mentioned relationship (1).

In particular, in the configuration illustrated in FIG. 10, the matrix has a square profile, whereas in the configuration illustrated in FIG. 11 the matrix has a hexagonal profile.

In the non-limiting solutions illustrated in FIGS. 4-11, each light source 18 belonging to the group S is preferably rotated by an angle α with respect to the adjacent light source in the same group S. However, said configuration is not necessary in order to achieve the desired optical effect. As already stated, it is in fact sufficient for at least one other light source in the group S to be rotated by an angle α with respect to the source in question. The fact that the light sources 18 rotated by an angle α are adjacent makes it easier to assemble and position the light sources 18.

In the examples illustrated in FIGS. 3-11 the light sources 18 all have the same square shape.

It is understood that the shape of the light sources 18 may be other than square and that the light sources 18 that do not belong to the group S can also differ from one another in shape and size.

In the non-limiting example described and illustrated herein the light sources 18 are LED light sources. Preferably, the LEDs that define the light sources 18 are white.

According to an alternative embodiment that is not illustrated, the light sources 18 are LEDs of the RGB (red green blue) type.

According to a further alternative embodiment that is not illustrated the light sources 18 are of the LARP (laser activated remote phosphor) type. For example, each LARP light source comprises a phosphor converter to which a pump laser is coupled. For example, a yellow phosphor converter coupled to a blue laser diode generates a white light.

Alternatively, the LARP light sources can also be coupled to laser diodes of different colours (red, green or blue).

With reference to FIG. 1, the first optical assembly 11 and the second optical assembly 16 are preferably different to one another.

Here and throughout the rest of this document, the term optical assembly refers to an optical assembly capable of altering the direction of at least a portion of the light rays that make up the beam emitted by the source assembly 10. For example, an optical assembly may comprise at least one lens and/or a group of lenses and/or one or more collimators and/or one or more reflectors and/or one or more prismatic elements and/or one or more mixers and/or one or more condensers.

With reference to FIG. 2, the first optical assembly 11 is arranged downstream of the source assembly 10 in order to intercept the light beam emitted by the source assembly 10.

Preferably, the first optical assembly is arranged downstream of the colour assembly 14 (FIG. 1).

With reference to FIG. 1, the optical assembly 16 is an optical output assembly, arranged at the point furthest downstream along the axis A, so as to be the last assembly able to process the intercepted light beam. The optical assembly 16 comprises one or more lenses (not illustrated in the accompanying figures) arranged and configured so that the optical assembly 16 has a positive refractive power. The optical assembly 16 is preferably movable along the axis A to adjust the focus of the projected image. In particular, the optical assembly 16 is able to move along the axis A between a first operating position and a second operating position. The optical assembly 16 preferably comprises a support frame coupled to a carriage which can move along the axis A (not illustrated for the sake of simplicity), the movement of which is regulated by an autofocus device (of a known type and not illustrated).

Figure 12:
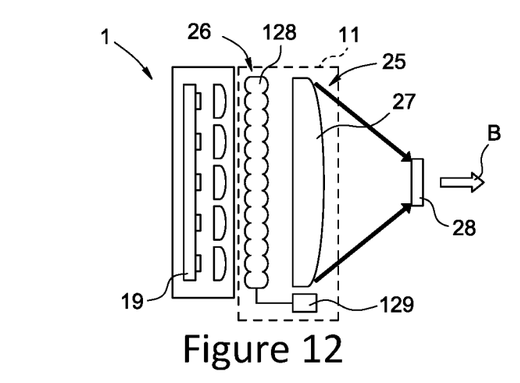
FIG. 12 is a schematic side view, with some parts shown in cross-section and some parts removed for the sake of clarity, of a second detail of the light fixture of FIG. 1 in a first operating position.

With reference to FIG. 12, the first optical assembly 11 comprises at least one condenser device 25, which is configured to concentrate the entering beam in the desired manner and a mixing device 26, which is configured to mix the rays of the incoming light beams to generate a mixed and homogeneous light beam.

The mixing device 26 of the first optical assembly 11 is arranged upstream of the condenser device 25 along the emission direction B of the beam and downstream of the source assembly 10.

In the non-limiting example described and illustrated herein, the condenser device 25 comprises a lens 27 configured to concentrate the beam in a given plane (called the focal plane) in which there is preferably arranged a processing element 28 of the beam processing means 15 (schematically illustrated in FIG. 1). The condenser device 25 is preferably configured to concentrate the light beam in such a way that the beam has a smaller cross-section than the cross-section of the beam entering the condenser 25 substantially in the region of a focal point in the focal plane.

For example, a gobo disk, or a diaphragm, or other elements of the beam processing means 15 may be positioned in the focal point.

In the non-limiting example described and illustrated herein, the lens 27 is a flat convex lens.

According to an alternative embodiment not illustrated herein, the condenser device 25 is defined by a group of coupled lenses.

Essentially, the light beam leaving the first optical assembly 11 illustrated in FIG. 2 is condensed. In this way, the light beam leaving the first optical assembly 11 is a beam with an optical axis O, which in the non-limiting example described and illustrated herein coincides with the longitudinal axis A.

Thanks to the particular arrangement of the light sources 18 of the source assembly 10, the light beam leaving the first optical assembly 11 has a substantially circular perimeter profile irrespective of the shape of the individual light sources 18 used.

Figure 13:
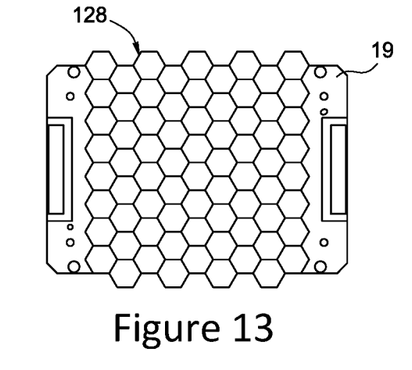
FIG. 13 is a schematic front view, with some parts removed for the sake of clarity, of the second detail of FIG. 12.
Figure 14:
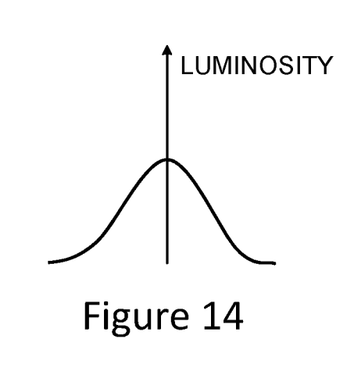
FIG. 14 is a schematic diagram of the luminosity of the beam emitted by the light fixture in the operating configuration of FIG. 12.
Figure 15:
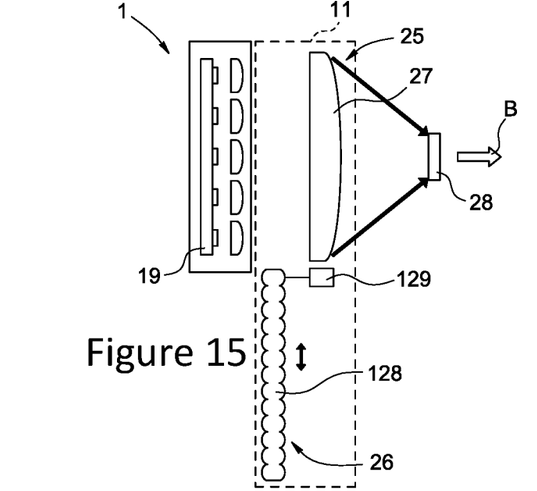
FIG. 15 is a schematic side view, with some parts shown in cross-section and some parts removed for the sake of clarity, of the second detail of FIG. 12 in a second operating position.

The mixing device 26 comprises an optical mixing element 128 and a moving device 129 (schematically illustrated in the accompanying FIGS. 12, 15 and 18) configured to move the optical mixing element 128 between a first position of non-interference with the light beam emitted by the source assembly 10 (configuration in FIGS. 15-17 and 18-20) and at least a second position of interference with the light beam emitted by the source assembly 10 (configuration in FIGS. 12-14).

Advantageously, in the interference position the mixing device 26 intercepts and appropriately mixes the light beam. This improves the quality of the projected beam. However, the inclusion of the mixing device 26 also results in a loss of luminosity of the projected beam as illustrated in FIG. 14.

Figure 17:
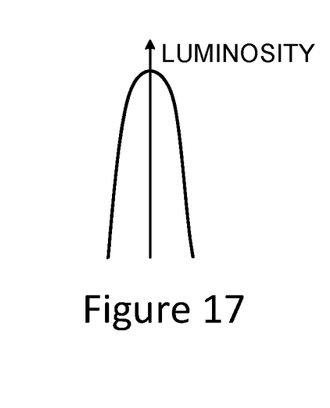
FIG. 17 is a schematic diagram of the luminosity of the beam emitted by the light fixture in the operating configuration of FIG. 15.
Figure 18:
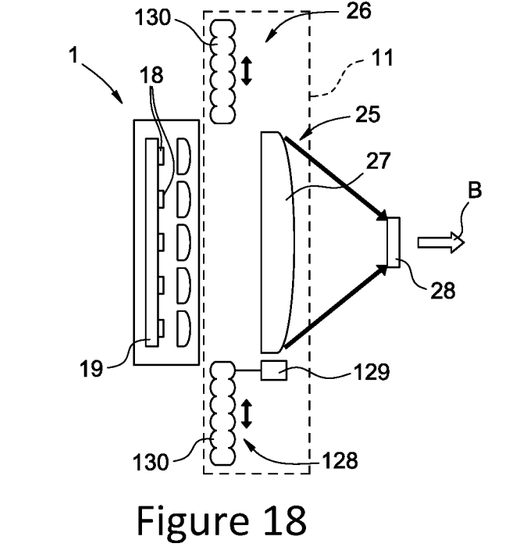
FIG. 18 is a schematic side view, with some parts shown in cross-section and some parts removed for the sake of clarity, of the second detail of FIG. 15 according to an alternative embodiment.
Figures 19, 20:
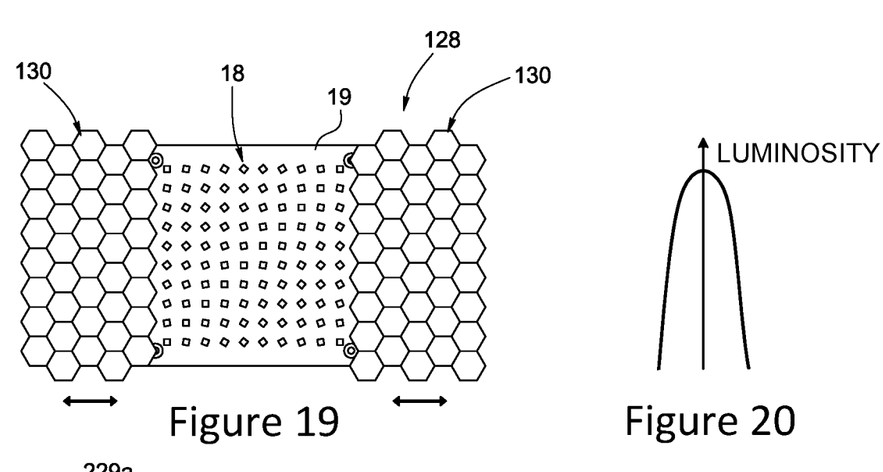
FIG. 19 is a schematic front view, with some parts removed for the sake of clarity, of the second detail of FIG. 18.
FIG. 20 is a schematic diagram of the luminosity of the beam emitted by the light fixture in the operating configuration of FIG. 18.

In the non-interference position, the luminosity of the beam emitted by the light fixture 1 is the maximum that can be obtained as illustrated in FIG. 17 and in FIG. 20. In this configuration, the light beam is in fact at high intensity. However, in the non-interference position, the quality of the beam is lower than the quality that can be achieved in the interference position, especially if the colour assembly 14 (not illustrated in FIGS. 2, 15 and 18) colours the beam emitted by the source assembly 10.

Essentially, the first optical assembly 11 is able to determine an increase in the luminosity or in the quality of the beam according to stage lighting needs.

For example, if the beam has to be projected at a long distance, the first optical assembly 11 can be adjusted so that the beam generated is characterised by a high level of luminosity (in technical jargon this solution is referred to as a hot spot and can be achieved with the optical mixing element 128 in the non-interference position), whereas if the beam has to be projected relatively close to the light fixture 1, the first optical assembly 11 can be adjusted so that the beam generated by the light fixture 1 is characterised by a high level of uniformity (in technical jargon this solution is referred to as a uniform even beam and can be achieved with the optical mixing element 128 in the interference position).

The optical mixing element 128 can be switched between the non-interference position and the interference position rapidly to obtain an immediate effect, or gradually, to obtain a gradual dimming effect (when switched from the non-interference position to the interference position) or a gradual increase in luminosity (when switched from the interference position to the non-interference position).

With reference to FIGS. 12, 13, 15, 16, 19 and 21, the optical mixing element 128 is preferably an optical element known in the jargon of the field as a fly's-eye optical element, or sometimes as a fly's-eye condenser or fly's-eye mirror.

The optical mixing element 128 comprises a plurality of lenses arranged side by side so as to form an array. Each lens projects an image proportional to its own shape. The overlapping of the projected images determines a mixing of the light beams emitted by the source assembly 10.

Figure 16:
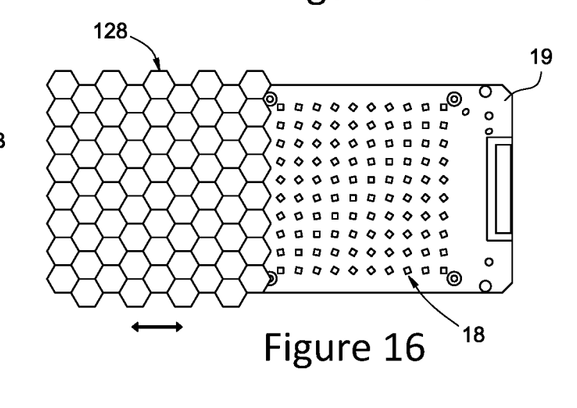
FIG. 16 is a schematic front view, with some parts removed for the sake of clarity, of the second detail of FIG. 15.

In FIGS. 13, 16 and 19, the optical mixing element 128 is composed of hexagonal lenses.

Figure 21:
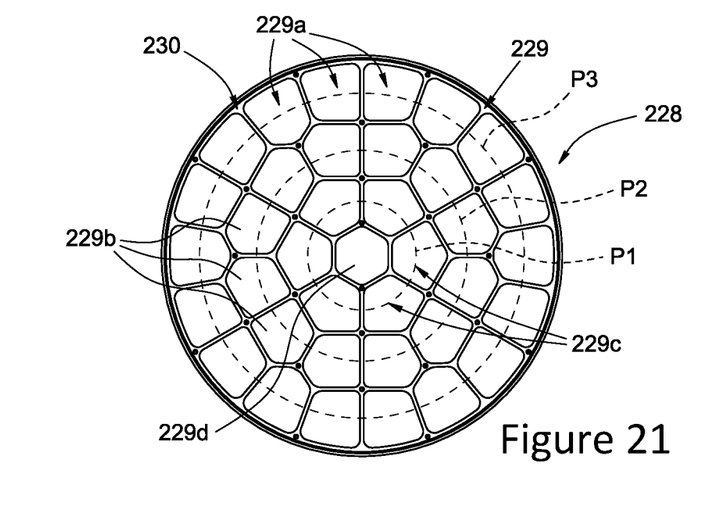
FIG. 21 is a schematic front view of a further detail of the light fixture of FIG. 12 according to an alternative embodiment.

FIG. 21 illustrates an alternative embodiment of the optical mixing element 228. According to this alternative embodiment, the optical mixing element 228 comprises a plurality of lenses 229 arranged side by side. The plurality of lenses 229 comprise at least two lenses 229 provided with emission faces having a different perimeter shape.

In this way the available surface can be exploited in the best possible way.

Furthermore, the optical mixing element 228 comprises a perimeter group 230 of lenses 229a, which are arranged side by side to define a perimeter profile of the optical mixing element 228. In this way the perimeter profile of the optical mixing element 228 is defined by the perimeter group 230 and can be modified simply by adjusting the shape of the lenses 229a in the perimeter group 230.

In the non-limiting example described and illustrated herein, the lenses 229a in the perimeter group 230 have at least one side that is curved, or that approximates a curve, so as to define, when arranged side by side, a substantially circular perimeter profile of the optical mixing element 228.

In the non-limiting example described and illustrated herein, the plurality of lenses 229 comprise a central lens 229d having a hexagonally-shaped emission face, a first group of lenses 229c having an emission face with a pentagonal perimeter and arranged along a first circular path P1, a second group of lenses 229b having an emission face with a pentagonal perimeter and arranged along a second circular path P2 concentric to P1, and the perimeter group 230 composed of lenses 229a having an emission face with a quadrangular or pentagonal perimeter and arranged along a third circular path P3 concentric to P1 and to P2.

In the non-limiting example described herein and illustrated in FIGS. 12, 13, 15 and 16, the optical mixing element 128 is substantially monolithic and moved by the moving device 129 between a first position of non-interference with the light beam emitted by the source assembly 10 (configuration in FIGS. 15-16, 18-19) and at least a second position of interference with the light beam emitted by the source assembly 10 (configuration in FIGS. 12-13).

According to an alternative embodiment illustrated in FIGS. 18 and 19, the optical element 128 is divided into a number of portions 130 which are movable along a direction orthogonal to the emission direction B of the beam. The expression "along a direction orthogonal to the emission direction B of the beam" clearly means any direction in a plane orthogonal to the emission direction B of the beam.

In other words, the portions 130 are movable along a plane orthogonal to the emission direction B of the beam.

In the non-limiting example described herein and illustrated in FIG. 19, the optical mixing element 128 is composed of two substantially identical portions 130 movable along a direction orthogonal to the emission direction B of the beam.

The source assembly 10 arranged in the light fixture in FIGS. 12, 13, 15, 16, 18 and 19 is preferably that illustrated in FIG. 10, in which substantially all of the light sources 18 belong to the group S of rotated sources.

FIGS. 4-9 illustrate alternative embodiments of the source assembly 10 in which the group S of light sources 18 is defined by light sources 18 which are rotated and arranged along at least one same row of the matrix (examples in FIGS. 4 and 6), along at least one same column of the matrix (examples in FIGS. 5 and 6) and along at least one same diagonal of the matrix (examples in FIGS. 7-9). In the case of the light sources 10 illustrated in FIGS. 4-9, optical mixing elements 128 similar to and/or different from the one illustrated in FIGS. 13 and 19 can be used.

In the cases illustrated in FIGS. 4-9, the number n of light sources 18 that make up the group S and their arrangement depend on the type of optical mixing element 128 that is used. In particular, the number n and the arrangement of the light sources that make up the group S depend on the shape and on the arrangement of the portion of the matrix of light sources 18 left uncovered during the movement of the optical mixing element 128. Essentially, the number n of light sources 18 that make up the group S and their arrangement is chosen in such a way that when the optical mixing element 128 moves towards the position of non-interference the source assembly 10 still emits a light beam with a substantially circular profile thanks to the particular arrangement of the light sources 18 in the group S.

In particular, in FIG. 4 the optical mixing element 128 illustrated by means of a broken line is substantially identical to that shown in FIG. 19. In FIG. 5, on the other hand, the optical mixing element 128 illustrated by means of a broken line is substantially identical to that shown in FIG. 19 in that it is divided into two substantially identical portions 130 but is movable along a direction orthogonal to the direction along which the optical mixing element 128 shown in FIG. 4 is movable, to selectively intercept the light beam.

Also in the configurations illustrated in FIGS. 7 and 8, the optical mixing element 128 illustrated by means of a broken line is divided into two substantially identical portions 130 that are movable to selectively intercept the light beam.

Essentially, in the configurations in FIGS. 4, 5, 7 and 8, the optical mixing element 128 is divided into two substantially identical portions 130 that are movable along a direction substantially orthogonal to the emission direction B of the beam and orthogonal to the line separating the two portions 130 to selectively intercept the light beam.

In the solutions illustrated in FIGS. 6 and 9, the optical mixing element 128 is divided into 4 substantially identical parts that are movable to selectively intercept the light beam.

In the configuration in FIG. 6, the four parts 130 have a four-sided shape and are able to move, as required, along a same direction substantially orthogonal to the emission direction B of the beam or along at least two directions orthogonal to one another and orthogonal to the emission direction B of the beam.

In the configuration in FIG. 9, the four parts 130 are triangular and are able to move along at least two directions orthogonal to one another and orthogonal to the emission direction B of the beam.

The movement of the portions 130 illustrated in the configurations in FIGS. 4-9 and 19 is preferably simultaneous and regulated by the moving device 129. In the configurations in FIGS. 4-9 and 19, the simultaneous movement is also symmetrical.

According to an alternative embodiment that is not illustrated, each portion 130 can move independently.

The moving device 129 may comprise one or more motors to move the optical mixing element 128 and the related motion transmission devices (not illustrated in the accompanying figures for the sake of simplicity).

The moving device 129 is regulated by means of a control device (not visible in the accompanying figures). The control device of the moving device 129 may also be managed remotely preferably by means of one or more external signals received, for example, using the DMX communication protocol.

Advantageously, the control device can adjust the moving device 129 in order to obtain a variation in the intensity of the light beam.

As shown in FIGS. 14, 17 and 20, adjusting the position of the optical mixing element 128 affects the intensity of the light beam projected by the light fixture 1. Thus, adjusting the position of the optical mixing element 128 adjusts the intensity of the light beam.

Advantageously, the luminosity of the source assembly 10 can be adjusted according to the operating position of the optical element 128. In particular, the light fixture comprises a control device of the source assembly 10 (not illustrated), which is configured to regulate the luminosity of each light source 18 or of one or more groups of light sources 18, based on the operating position of the optical element 128. For example, the control device of the source assembly 10 can regulate the luminosity of each light source 18 or of one or more groups of light sources 18 according to the degree of interference of the optical element 128 with the light beam and/or according to the movement and positions of the movable portions 130 of the optical element 128.

Lastly, it is clear that modifications and variations may be made to the source assembly and to the light fixture described herein without departing from the scope of the appended claims.

The invention claimed is:
1. Light fixture comprising:
a source assembly (10) configured to generate a light beam mainly along an emission direction (B), the source assembly (10) comprising at least one light source and a collimator assembly which cooperates with the at least light source for generating the light beam;
at least one optical assembly (11) arranged downstream of the source assembly (10) along the emission direction (B); the optical assembly (11) comprising: at least one condenser device (25) which is configured to concentrate the light beam in a plane; and at least one mixing device (26) configured to mix the light beam passing through it; the mixing device (26) being arranged upstream of the condenser device (25) along the emission direction (B) of the light beam; the mixing device (26) comprising an optical mixing element (128) comprising a plurality of lenses arranged side by side so as to form an array; and a moving device (129) configured to selectively move the optical mixing element (128) between a position of non-interference with the light beam emitted by the source assembly (10) and at least one position of interference with the light beam emitted by the source assembly (10); wherein, in the non-interference position, the light beam emitted by the source assembly (10) does not pass through the optical mixing element, while in the interference position, the light beam emitted by the source assembly (10) passes through and is acted on by the optical mixing element (128).

2. Light fixture according to claim 1, wherein the optical mixing element (128) is divided into at least two portions (130) which are movable to selectively interfere with the light beam.

3. Light fixture according to claim 2, wherein the portions (130) are movable along a direction substantially orthogonal to the emission direction (B) of the light beam.

4. Light fixture according to claim 2, wherein the portions (130) are movable along a direction substantially orthogonal to the line separating the two portions (130).

5. Light fixture according to claim 2, wherein the optical mixing element (128) is divided into at least four portions (130).

6. Light fixture according to claim 2, wherein the moving device (129) is configured to move the portions (130) simultaneously.

7. Light fixture according to claim 1, wherein the source assembly (10) comprises a supporting plate (19) and a plurality of polygonal light sources (18) coupled to the supporting plate (19) and configured to emit respective light beams mainly along the emission direction (B); wherein the plurality of light sources (18) comprise a group (S) made of a number (n) of light sources (18) having the same polygonal shape; each light source (18) in the group (S) being rotated on its own axis with respect to the adjacent light source (18) in the group (S) by an angle (α) sequal to $$\alpha = [(360°/R)/K]$$

where:
R=order of rotational symmetry of the polygon defining the shape of the light sources (18);
K=is a coefficient respecting the following conditions
K=5 if n<5
K>5 if n=>5.

8. Light fixture according to claim 7, wherein the number (n) of light sources (18) defining the group (S) is equal to at least 10% of a total number (N) of the plurality of light sources (18).

9. Light fixture according to claim 7, wherein the number (n) of light sources (18) defining the group (S) is equal to at least 50% of the total number (N) of the plurality of light sources (18).

10. Light fixture according to claim 7, wherein the light sources (18) of the plurality of light sources (18) are arranged according to a matrix provided with a plurality of rows and columns; the group (S) being defined by light sources (18) arranged along at least one same row or along at least one same column or along at least one same diagonal of the matrix.

11. Light fixture according to claim 1, wherein the source assembly (10) comprises a supporting plate (19) and a plurality of polygonal light sources (18) coupled to the supporting plate (19) and configured to emit respective light beams mainly along the emission direction (B); the light sources (18) are arranged symmetrically with respect to at least one plane of symmetry.

12. Light fixture according claim 11, wherein the light sources (18) of the plurality of light sources (18) are arranged according to a matrix provided with a plurality of rows and columns; if the matrix has an even number of columns, the light sources (18) are symmetrical with respect to a plane arranged between the innermost columns, whereas if the matrix has an odd number of columns, the light sources (18) are symmetrical with respect to a plane passing through the innermost column.

13. Light fixture according to claim 1, comprising a control device of the light source assembly (10) configured to regulate the luminosity of the source assembly (10) based on the operating position of the optical element (128).

14. Light fixture according to claim 1, comprising at least one control device of the moving device (129) configured to regulate the moving device (129) on the basis of at least one external signal.

\* \* \* \* \*